United States Patent Office 3,478,364
Patented Nov. 11, 1969

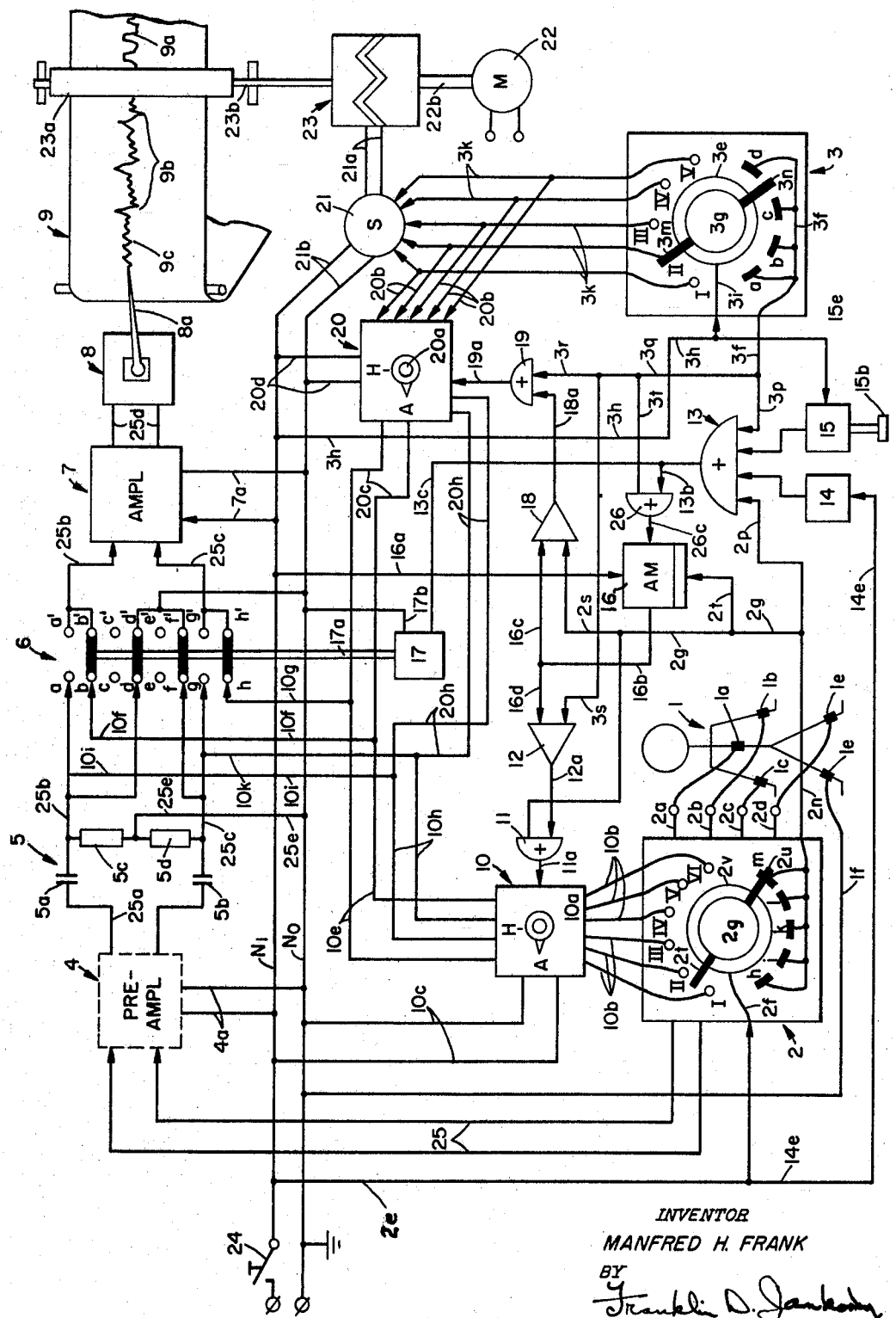

3,478,364
RECORDER HAVING DISTINGUISHABLE RECORDS
Manfred H. Frank, Freiburg im Breisgau, Germany, assignor to Fritz Hellige & Co., G.m.b.H., Freiburg im Breisgau, Germany
Filed July 2, 1968, Ser. No. 741,936
Claims priority, application Germany, July 2, 1967, 1,623,717
Int. Cl. G01d 9/34
U.S. Cl. 346—62                                    6 Claims

ABSTRACT OF THE DISCLOSURE

A device for visual display of amplified measuring signals having gating circuitry for displaying marking pulses. When changing from one source of measuring signals to another or from one recording speed to another, the measuring signals are blocked from entering the final amplifier via short-circuiting an alternating current coupling means to ground. Marking means are utilized to identify parameters of the amplified measuring signals. The marking means operate during the period when the amplified measuring signals are blocked so that either of two important parameters, or both, namely, the source of the amplified measuring signals and the speed of the visual display, may be displayed on recording means.

FIELD OF THE INVENTION

This invention relates to visual display devices and more particularly to a novel visual display device which provides marking pulses indicative of the either or both the source amplified measuring signals or the speed of the visual display.

DESCRIPTION OF THE PRIOR ART

Devices for displaying particular measuring signals are well known. More particularly, devices such as electrocardiographs and electroencephalographs are well known. When changing from one signal source or combination of signal sources, such as, from one part of a human body to another part or parts, short interruptions are experienced in the transition period. During such transition periods, due to the troubling electrostatic loads of the coupling capacitors, for example, caused by polarizations at the electrodes connected to the various points of the human body, the signal source is disconnected from the recording means by blocking the final amplifier receiving the measuring signals. Such devices utilized a so-called fast start or blocking circuitry whereby the measuring signals were short-circuited to ground during the transition periods. Thus, the normal visual display would show a series of measuring signals interspersed between a series of lines indicative of a reference line. However, since technological advances have demanded a more detailed analysis of information, it is imperative that an improved identification and coordination of displayed measuring signals be made readily available.

Accordingly, it is an object of the present invention to provide a novel visual display utilizing the transition periods between display of amplified measuring signals to display particular parameters of the measuring signals.

It is a further object of the present invention to provide a novel visual display which provides marking pulses during such transition periods indicative of the source or combination of sources of the amplified measuring signals.

It is a still further object of the present invention to provide a novel visual display which provides marking pulses during such transition periods indicative of the speed of the visual display.

It is another object of the present invention to provide a novel visual display which provides marking pulses during such transition periods indicative of either the source or combination of sources of the measuring signals or the speed of the visual display.

SUMMARY OF THE INVENTION

In accordance with the objects set forth above, the present invention provides a device for visual display of amplified measuring signals having gating circuitry for displaying marking pulses. Controlling means are utilized to block the amplified measuring means from the final amplifier and to connect marking means to the final amplifier. Marking means are utilized to provide marking pulses indicative of either the signal source or the speed of the visual display. During the transition period, i.e., the period when the amplified measuring signals are blocked from appearing on the visual display, either the source of the amplified measuring signals or the speed of the visual display, or both, may be recorded on the display so as to make such indicia conveniently available.

BRIEF DESCRIPTION OF THE DRAWING

Additional objects, advantages, and characteristic features of the present invention will become readily apparent from the following detailed description of preferred embodiments of the invention when taken in conjunction with the accompanying drawing which is a schematic of a device for visually displaying amplified measuring signals and marking pulses indicative of the source or combination of sources of the amplified measuring signals and the speed of the visual display.

DESCRIPTION OF THE PREFERRED EMBODIMENTS

Referring now to the drawing, there is shown a schematic of a testing person 1 having electrodes 1a through 1e connected to the chest area and the extremities of the body. The several electrodes attached to the testing person 1 essentially represents the arrangement by which connections may be made between the testing person 1 and a device, such as, an electrocardiograph which is apparatus for recording electrical voltages caused by the actions of the heart. The electrodes 1a through 1d are shown connected to the terminals 2a through 2d, respectively, of a source selector switch 2. The electrode 1e is connected to a reference potential line $N_0$, or ground, via line 1f. The selector switch 2 may be attached by a knob 2g for selecting defined combinations of the signal inputs, such combinations being well known to those skilled in the art, in order that various contractions, such as, the contraction of the auricles or the contraction of the ventricles of the heart, may be recorded. The electrical voltages may then be transferred to a preamplifier via lines 25.

The electrical voltages are amplified in the preamplifier 4 and then travel to alternating current coupling means 5 via lines 25a. The alternating current couping means 5 comprises two coupling capacitors, 5a and 5b, and two shunt resistances, 5c and 5d, as shown. The common connecting point of the alternating current coupling means 5 is connected to the reference potential line $N_0$ via the line 25e. The output of the alternating current coupling means 5 may be connected to the amplifier 7 via the lines 25b and 25c in order that amplified measuring signals be recorded as indicative of the electrical voltages created by the actions of the heart.

The drawing illustrates the state wherein the amplified measuring signals are not transferred from the alternating current coupling member 5 to the amplifier 7. Thus, the amplifier 7 is blocked from receiving the amplified measuring signals. In the normal recording of the amplified signals, the signals would be transferred to the amplifier 7 via contact pairs 6a–a′ and 6g–g′ and contact bridges 6a and 6d of a blocking switch 6. The output of the amplifier 7 would be fed into a writing or recording instrument 8 via lines 25d. The writing or recording instrument 8 may be any known writing or recording instrument, for example, a rotating coil measuring instrument or a moving-iron-measuring instrument of known construction which would include a writing member 8a. The amplified measuring signals would produce a visual record, such as that illustrated by the designation 9b, commonly known as an electrocardiogram, on the recording tape 9. For starting the device illustrated by the drawing, on-off switch 24 must be closed in order to supply current throughout the device via line $N_1$ and $N_0$. Referring again to the blocking switch 6, in the past, it has been well known that the source of the amplified measuring signals may be blocked from the final amplifier in either an arbitrary manner, or synchronously with a source selector switch. The blocking has been accomplished by switching means wherein the source of the amplified measuring signals were disconnected from the final amplifier by short circuiting the alternating current coupling means 5 to ground. The short-circuiting of the alternating current coupling means 5 is necessitated by the large time constants experienced during switching. Thus, such blocking means serve to eliminate any troubling electrostatic loads of the coupling capacitors, for example, caused by polarizations at the electrodes. The known art relating to the blocking method utilized is thoroughly described in the Swiss Patent Print 352,453.

The present invention utilizes blocking periods, or transition periods between recording of the different amplified measuring signals to gate marking pulses into the amplifier 7, in order to facilitate the identification of the next source of amplified measuring signals. In addition, the invention proposes to use the shorter transition intervals to provide identification of another important parameter of the device, namely, the selected speed of the visual display.

The blocking switch 6 of the present invention is utilized in conjunction with a blocking delay switch 17 and its associated armature 17a to block the amplified measuring signals from being transferred from the preamplifier 4 to the amplifier 7. During the blocking period the coupling capacitors 5a and 5b are discharged to the reference potential line $N_0$ in order to eliminate undesirable readings on the recording tape 9. The blocking of the amplifier 7 can be accomplished by changing the source selector switch 2, or a speed selector switch 3, or by arbitrary command, i.e., by actuating the switch 15. In addition, the blocking may be initiated by outside sources, e.g., by high frequency interferences produced by adjacent surgical instruments. In order to ensure the latter blocking, a switch 14, connected to the supply current $N_1$ via line 14e, is provided.

In the operation of the device illustrated by the drawing, when the selector switch 2 is actuated by means of the selector switch knob 2g, not only the corresponding signals or signal combinations are selected, but synchronously a circuit is closed over the lines 2e, 2f, a contact ring 2v, a contact bridge 2t, and one of the switch contacts I through VI, and the corresponding branch of the lines 10b leading to a pulse forming stage 10. Thus, a path is completed for furnishing pulses for marking the source of the selected signal or signal combinations on the recording tape 9. In the output of the pulse forming stage 10 a coordinate marking pulse sequence is formed and is available to be gated into the amplifier 7. In order to avoid that the marking pulses are not produced during the state when the amplifier 7 is not blocked, the pulse forming stage 10 is controlled by a controlling gate 13. This controlling is accomplished via the lines 13a and 13b, AND gate 26, line 26c, an astable multivibrator 16, line 16b, line 16d, OR gate 12, line 12a, AND gate 11, and the line 11a.

In a like manner, the marking of a change in the selected speed for the recording tape 9 may be made available by actuating a speed selector switch 3 by means of the switch knob 3g. By actuating the switch knob 3g, a servomotor 21 is started into the working stage via lines 3h and 3i, the inner contact 3e, the contact bridge 3m, the chosen contact of the speed selector 3, one of the contacts 3I through 3V, and one of the connecting lines 3k. The supply current for the servomotor 21 is fed through the lines 21b. Thus, the servomotor may actuate a speed changing gear 23 according to the selected speed. Synchronously, the pulse forming stage 20 is switched on by one of the several lines 20b, the branch being coordinated to the selected speed so that marking pulses are furnished on the lines 20c, the output of the pulse forming stage 20 being indicative of the selected speed. These marking pulses are then available to be gated into the amplifier 7. In order to avoid that the marking pulses are not produced during the state when the amplifier 7 is not blocked, the pulse forming stage 20 is also controlled by a controlling gate 13. This controlling is accomplished via the lines 13a and 13b, AND gate 26, line 26c, the astable multivibrator 16, line 16b, line 16c, OR gate 18, line 18a, AND gate 19, and the line 19a.

Referring now to the driving mechanism for the recording tape 9, the tape is driven by a motor 22 through the shaft 22b and 23b and over the speed changing gear 23, and a driving roll 23a. The recording trace illustrated on the tape 9 by the designation 9b is illustrative of the amplified measuring signals while the designation 9c may be illustrative of one of the parameters, either one of the sources of the amplified measuring signals or one of the speeds of the recording tape 9. Also, the designation 9a could illustrate either parameter.

The drawing shows the selector switch 2 in the state of passing between one signal source (contact I) to another signal source (contact II). The AND gate for actuating blocking of the relay switch 17 is then receiving a controlling current through the lines 2e and 2f, intercontact ring 2v of the selector switch 2, contact bridge 2u, contact segment 2m, collecting branch 2n and controlling branch 2p, the controlling gate 13, and lines 13a and 13c. The blocking relay switch 17 is fed with current that will cause it to attract, thus, switching the contact bridges 6a through 6d to the positions shown in the drawing. The amplifier 7 will then be blocked from receiving amplified measuring signals. At this time the astable multivibrator 16 is actuated through lines 13a, 13b, AND gate 26, and line 26c, by receiving another pulse through line 2t in such a manner, that at first the astable multivibrator 16 is producing a rectangular pulse and afterwards is releasing to the pulse forming stage 20 through its output 16b, line 16c, OR gate 18, and AND gate 19. Thus, the amplifier 7 at first is receiving pulses for marking the speed II for the recording tape 9 at the moment of this selection. The marking pulse for the selected speed will only record during the change from contact I to contact II of the source selector switch 2. When the contact bridge 2t of the selector switch 2 is being put on contact II, then the contact bridge 2u is between the two contact segments m and 1, thus, the controlling leads 2n, 2p, 2g, 2t, 2r and 2s are separated from the supply current. Therefore, owing to the existence of a negation input at the AND gate 11, the pulse forming stage 10 for marking the selected signals is released.

Then during the next positive rectangular square wave pulse of the astable multivibrator 16 and during the remaining time of the break delay, the marking pulses for selected signal source (contact II) are recorded, whereas the marking of the speed terminates unless the break delay of relay switch is so long that another negative rectangular pulse can be furnished by the astable multivibrator 16. To achieve this it is necessary that the astable multivibrator 16 is also working with the delay of its switching off, so that it is able to furnish square wave pulses at its output 16b at least during the time of one period after a controlling current is staying away from its input 26a.

In an analogous manner, marking is accomplished by changing the speed for the recording tape 9 by means of the speed selector switch 3. During such a change, the recording tape 9 is stopped for a short time anyway, so that the marking pulses will not record at all. Assuming that a change from speed II to speed III is initiated, then the AND gate 13 receives a blocking pulse from the contact segment 13c of the speed selector switch 3 through the collecting leads 3f and 3p. The astable multivibrator is then also released and opens the pulse forming stage 10, whereas the pulse forming stage 20 is remaining closed owing to the negation input at the AND gate 19. In order to avoid that the astable multivibrator 16 is released before the changing of the speed has ended (remembering that prior to this phase, recording of the marking pulses is not possible owing to the stopping of the recording tape 9 during the interval of the changing of the speed), and AND gate 26 is inserted between the commanding relay 13 and the astable multivibrator 16, the second input over which is a negation input via the controlling outputs 3f, 3q, and 3t of the speed selector switch 3. Therefore, in such a case, the first marking pulses on the recording tape 9 are indicative of the selected signal sources and the second marking pulses are indicative of the selected speed.

It is also possible to gate in the marking pulses indicative of the source of the measured signals or the speed of the recording tape during the working phase of the device illustrated. In other words, it is possible to superimpose the marking pulses upon the amplified measuring signals. Such marking may be accomplished by switching the knob 10a of the pulse forming stage 10 or switching the knob 20a of the pulse forming stage 20 from their respective position A (automatic) to their position H (hand), for the time that the respective marking pulses are desired, it is superimposed upon the amplified measuring signals. If the knob 10a is switched to its respective position H, the marking pulses can be directly gated into the final amplifier 7 via the lines 25b and 25c through lines 10h, 10i and 10k. Similarly, the marking pulses for the selected speed can be directly gated from the pulse forming stage 20 to the final amplifier 7 via lines 20h, 10i, 10k, 25b and 25c, when the knob 20a is switched to its position H.

Thus, although the present invention has been shown and described with reference to particular embodiments, nevertheless, various changes and modifications obvious to a person skilled in the art to which the invention pertains are deemed to lie within the spirit, scope, and contemplation of the invention as set forth in the appended claims.

What is claimed is:
1. A device for visual displaying of measuring signals comprising:
   recording means for displaying measuring signals and marking pulses;
   first selector means for receiving and selecting said measuring signals;
   second selector means for selecting the speed of said recording means;
   first amplifier means connected to said first selector means for amplifying said measuring signals;
   second amplifier means for amplifying said measuring signals and said marking pulses;
   alternating current coupling means for transferring said measuring signals from said first amplifier to said second amplifier;
   first pulse froming means cooperating with said first selector means and said second amplifier means for developing marking pulses indicative of the source of said measuring signals;
   second pulse forming means cooperating with said second selector means and said second amplifier for developing marking pulses indicative of the speed of said recording means;
   first switching means for disconnecting said alternating current coupling means from said second amplifier and for alternately connecting either said first pulse forming means or said second pulse forming means to said second amplifier;
   control means cooperating with said first and second selector means, said first switching means, and said first and second pulse forming means for determining which of said marking pulses are delivered to said second amplifier during the time that said measuring signals are disconnected from said second amplifier; and
   drive mechanism means connected between said second selector switch and said recording means for driving said recording means.

2. A device as recited in claim 1 wherein said controlling means includes a manual switching for actuating blocking of said measuring signals.

3. A device as recited in claim 1 wherein said controlling means includes detector means for blocking said measuring signals, said detector means adapted to receive outside interference signals for initiating blocking of said measuring signals.

4. A device as recited in claim 1 wherein said first switching means includes a delay of a sufficient interval to gate in marking pulses indicative of said source of measuring signals or the speed of said visual display.

5. A device as recited in claim 1 wherein said controlling means includes an astable multivibrator and associated circuitry for alternately providing said marking pulses indicative of said source of measuring signals or said marking pulses indicative of said speed of said recording means.

6. A device as recited in claim 1 wherein second and third switching means are connected between said second amplifier means and said first and second pulse forming means, respectively, for manually gating said respective marking pulses directly into said second amplifier means.

References Cited

UNITED STATES PATENTS 2,663,855  12/1953  Beggs et al.
3,374,485  3/1968  Gemmer _____ 346—23

JOSEPH W. HARTARY, Primary Examiner

U.S. Cl. X.R.

128—2.06

UNITED STATES PATENT OFFICE
CERTIFICATE OF CORRECTION

Patent No. 3,478,364          Dated November 11, 1969

Inventor(s) Manfred H. Frank

It is certified that error appears in the above-identified patent and that said Letters Patent are hereby corrected as shown below:

Col. 1, line 33, before "either" delete "the"

Col. 2, line 58, "couping" should be "coupling"

Col. 3, line 37, "shorter" should be "short"

SIGNED AND SEALED

JUN 23 1970

(SEAL)
Attest:

Edward M. Fletcher, Jr.
Attesting Officer

WILLIAM E. SCHUYLER, JR.
Commissioner of Patents